Jan. 3, 1933. A. R. LE BAILLY 1,893,295
SPRING SUPPORT
Filed March 7, 1931 2 Sheets-Sheet 1
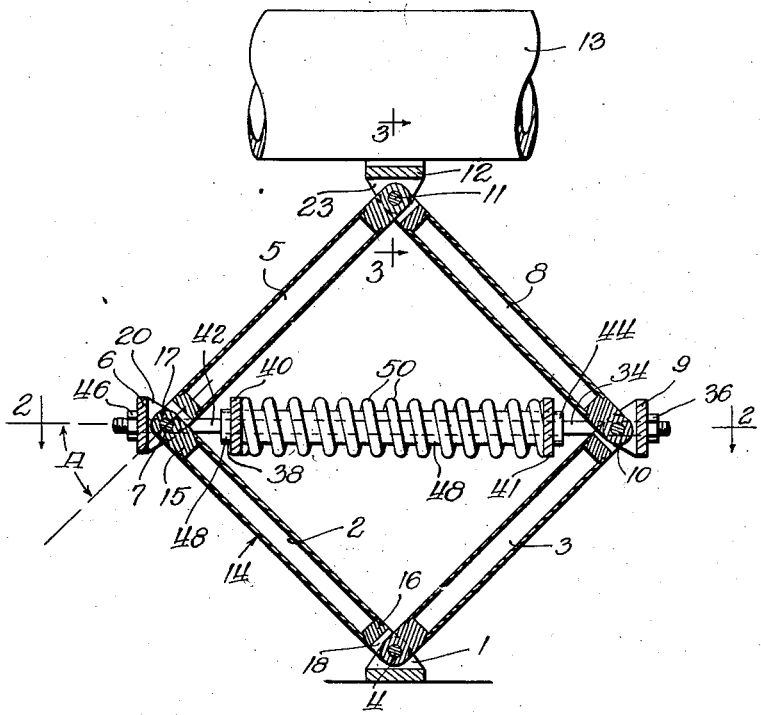
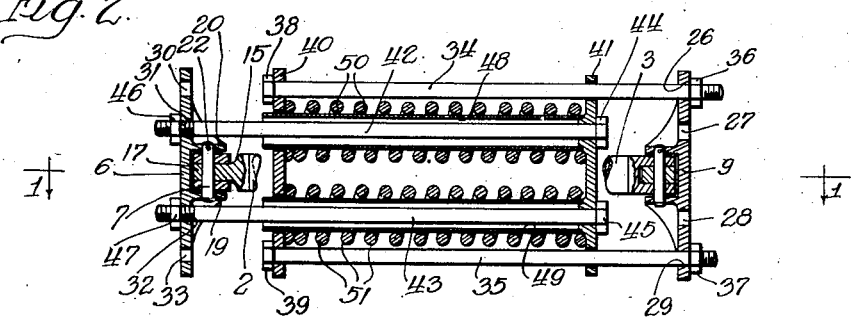
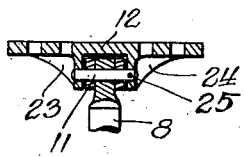
Inventor:
Andrew R. Le Bailly.
By [signature]
Attys.

Jan. 3, 1933.  A. R. LE BAILLY  1,893,295
SPRING SUPPORT
Filed March 7, 1931  2 Sheets-Sheet 2
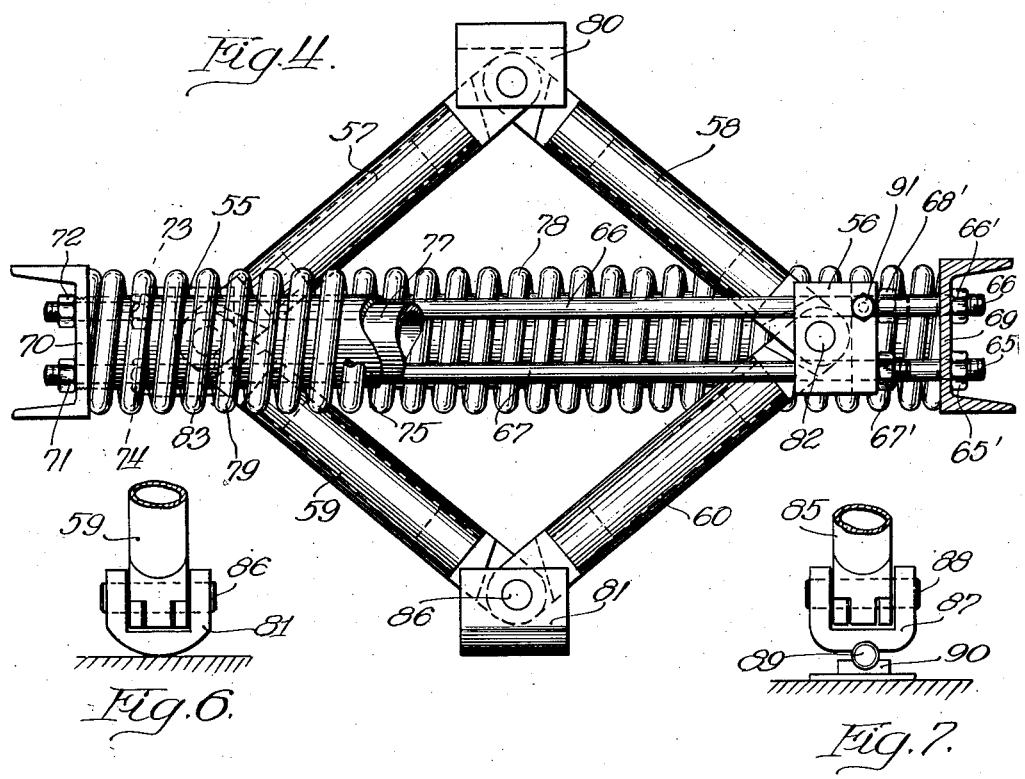
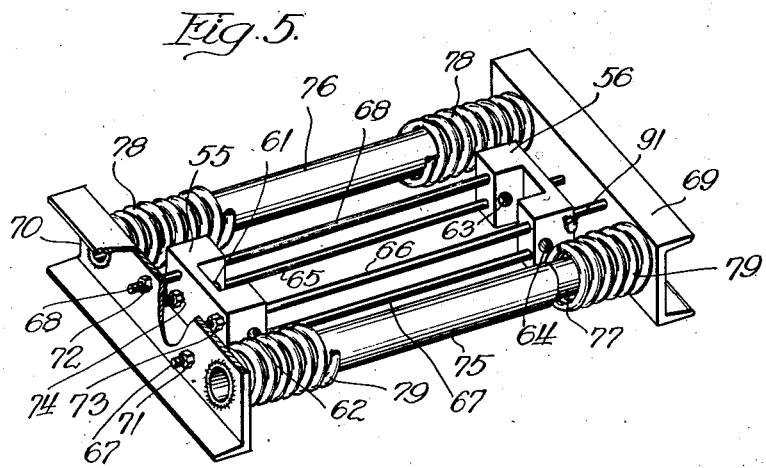
Inventor:
Andrew R. Le Bailly
By
Attys.

Patented Jan. 3, 1933

1,893,295

UNITED STATES PATENT OFFICE

ANDREW R. LE BAILLY, OF CHICAGO, ILLINOIS, ASSIGNOR TO SARGENT & LUNDY, OF CHICAGO, ILLINOIS, A CORPORATION OF ILLINOIS

SPRING SUPPORT

Application filed March 7, 1931. Serial No. 520,772.

This invention relates generally to supports and is particularly concerned with novel and improved spring supports, that is to say, with spring supports which provide equal reaction, and which are adapted to balance loads, subject to displacements, in an efficient and reliable manner.

The structures which I disclose in this invention are particularly adapted to support high pressure superheated steam pipes and the like, such for example as may be found in power plants, but they may also be put to other uses. The invention may be used advantageously in all cases in which a dependable support is desired for a body which is subject to displacements, for example due to contraction and expansion, or which shifts relative to the support due to buckling or other causes. My invention will be found useful for supporting various machines or machine parts which are subject to movements or displacements in the course of their normal operations.

In case of power plants having heavy high pressure superheated steam pipes, the support of these pipes represents a problem which frequently offers great difficulties. The pipes are of considerable weight and subject to expansion and contraction resulting in varying stresses and displacements. The supports must therefore yield to the displacements of the pipe without altering the supporting function at any moment, and without imposing stresses.

Steam pipes are usually supported by suitable brackets which are rigidly attached to walls or other structures. In case of horizontal runs, such bracket supports may serve relatively well, provided they are adapted to take care of the buckling of the pipe, since expansion and contraction of the pipe takes place longitudinally to the pipe. However, in cases of vertical runs, or curved portions of a steam pipe, the problem of support appears as a serious one and may under certain conditions assume formidable proportions, because the displacements due to expansion and contraction, as well as the displacements due to buckling must be taken care of.

Two examples may be mentioned in which the support is particularly difficult.

Assuming for instance that a heavy steam pipe rises from the floor and then bends in right angle to continue in a horizontal run. Obviously, expansion and contraction of the vertical portion of the pipe will shift the pipe up and down, and buckling will cause lateral displacements. Placing the horizontal run of the pipe on rigid brackets will cause difficulties and may even cause serious damage since the pipe will lift from the brackets upon expanding vertically and will heavily rest on the brackets upon contracting. This obviously subjects the pipe to stresses which may cause troubles. There is no balancing of the load and no equal support at any moment during expansion and contraction. A portion of the pipe may be suspended for a certain period (during vertical expansion) and supported for another period of time (during vertical contraction). This condition becomes an imperative problem particularly in cases of heavy pipes carrying superheated steam.

Another example of a difficult support is represented in a case in which a steam pipe rises vertically from the floor, makes a 180° bend, and continues again vertically through the floor parallel to the first rise. The curved portion of the pipe must be supported in some manner. It is obvious that a rigid support will not meet this condition, because the pipe expands and contracts, and will, as in the first case, rest on the support during periods of contraction but will be suspended during periods of expansion.

Lateral displacements of the pipe, due to buckling of the same must be taken into account in either of the above mentioned cases, and must be taken care of by the support.

The support, if rigid, is in cases like those mentioned above, intermittent, causing great stresses which may become manifest in serious damage and operation trouble.

It appears from the above discussion that a support of this type, regardless of the specific purpose which it serves, must be continuous instead of intermittent in order to avoid possible damage and trouble, and that this continuity of support must be achieved regardless of displacements of the supported part or parts due to their normal operation or function. The support must be constructed so as to follow the supported part throughout its movements and to provide a substantially constant supporting force or equal reaction at any moment.

It is the principal aim and purpose of my invention to provide a continuous support for weights or loads which shift or are subject to displacement in the course of their normal operation.

The equal reaction spring supports which I have disclosed in the present case consist, broadly speaking, of a movable link frame comprising several cooperating parts controlled by spring means which adapt the frame to yield to the motion of the load or weight, supported by the frame, in such a manner that the load is supported with equal reaction of supporting force throughout its movements or displacements.

The above definition, at first glance, may appear to include the structure of a simple compression spring disposed within a frame having two members or plates, one resting on the floor, for example, and the other disposed directly under the load, or a structure having two springs disposed in parallel to each other and operating between two plate members. However, neither of these structures will balance the load with equal reaction of supporting force throughout displacements of the load. There will also be a tilting effect in either case, and, in addition, it must be considered that such simple provision cannot meet the problem of supporting a heavy weight such as represented by a superheated steam pipe and the like, even when a plurality of springs are provided, each intended to support only a fraction of the load.

I have achieved the equal reaction of the novel spring support by arranging a plurality of springs in a movable link frame in such a manner as to make the individual spring action interdependent and cumulative, and by arranging the movable link frame so that a compression of the frame in the direction of the load will cause expansion of the frame in right angle to the direction of compression, thereby causing compression of the springs disposed within the link frame in the plane of expansion thereof.

The spring or springs in my novel support are arranged substantially parallel to the load (if the load is assumed to be a horizontally disposed portion of a pipe or the like). The reaction, transversely to the load, will be substantially equal at any point during the movement of the supporting member placed under the load, and, therefore, the supporting force will be substantially constant or equal throughout displacements of the load. This substantially equal reaction is, however, also achieved if the load should be of a different kind. The support is not limited to the use in connection with steam pipes, nor to the use in connection with horizontally disposed pipes.

In one embodiment of the invention, the link frame consists of tubular standard pipes, each provided with bearing brackets at the ends. These bearing brackets of the link pipes are joined by means of pins uniting the pipe ends with suitable toggle saddles. One toggle saddle, when placed on the floor, represents the base saddle of the support, and the opposite toggle saddle is the apex saddle and is put under the load. Two side saddles are disposed in a horizontal plane and join the other ends of the frame pipes. I have, therefore, a rhombus shaped link frame comprising toggle saddles for securing the joints of the frame. The weight of the load placed on the apex saddle, will tend to compress the frame, whereby the toggle saddles uniting the link pipes at the sides will move apart. The spring or springs are disposed between plates which are placed intermediate of these latter toggle saddles, that is, they are disposed in right angle to the direction of compression caused by the load. Each of the toggle saddles, which move apart in response to a depression of the frame, is adapted to move a plate toward the center of the support in the plane of the movement of the side toggle saddles. Compression springs are mounted between these plates on suitable guides. Therefore, when the load depresses the frame, the frame will expand and move the plates in the plane of expansion, thereby compressing the spring or springs disposed between the plates. The compression of the springs being opposed to the expansion of the frame, it will be understood that a force will be manifest between the base of the support and the apex saddle member which is placed under the load, opposing the compression of the frame by the load, in other words, yieldingly supporting the load. The support is free to move in accordance with any movement of the load within practical limits of operation, and provides a continuous support for the load regardless of the position of the load relative to the frame. The frame may be adapted to supporting any load within reasonable limits of weight by choosing proper springs and proportioning the link frame structure accordingly.

In another embodiment, I have shown a frame or cage, comprising two structural frame members joined by telescoping pipes. These pipes serve as guides for compression springs which tend to move the two frame members apart. Disposed intermediate of these springs, within the above mentioned frame members forming the cage, are two toggle saddles or carriers. Each of these carriers is joined to a corresponding one of the structural frame members by means of suitable rods which project slidingly through the other toggle carrier. The arrangement is such that these two toggle carriers can be moved within the structural frame members slidingly toward each other and apart from each other, sliding along the rods which connect them with the structural frame members defining the cage. The movement of the toggle carriers apart from each other is limited by the length of the rods which hold them in assembly with the structural frame members, the rods being secured to a carrier and to the corresponding frame member by means of nuts attached to threaded ends of the rods. The structural frame members which are joined by telescoping pipes (serving as guides for the compression springs), and the toggle carriers disposed slidingly on the rods which are secured to the frame members, thus form the central part of a unitary assembly of the movable link support.

Should it occur that the toggle carriers within the structural frame members are forcibly spread apart, the result will be a tendency to draw the frame members together against the force of the compression springs which are mounted on the telescoping pipes. This operation is due to the action of the rods which hold the respective toggle carriers in assembly with the frame members. In other words, when the toggle carriers are forcibly spread apart, they will exert a pull on the corresponding rods, and this pull will tend to move the corresponding frame members in the direction in which the force is applied to the toggle carriers. The toggle carriers, when spread apart, will draw the structural frame or cage members together against the force of the springs.

Pivotally mounted in each toggle carrier are two link members. These project angularly from opposite sides of the toggle carriers and are pivotally joined in toggle saddles. The latter are disposed on a line which is substantially perpendicular to the plane on which are disposed the toggle carriers and the springs. One of the saddles is the base saddle of the support, and the other saddle is the apex saddle which is placed under the load. The structure forms thus a rhombus shaped link frame comprising toggle saddles for securing the joints of the links, with two of the saddles disposed within a cage and adapted to move the side members of the cage against the force of springs mounted therebetween on telescoping tubular guides.

The weight of the load will tend to depress the apex saddle which is placed under it, and this saddle will therefore move downwardly along the line of depression, toward the base saddle. Accordingly, the link frame members, which are pivotally mounted in the toggle carriers, respectively, (forming a rhombus, i. e., an equilateral parallelogram, having its angles oblique), will tend to spread the toggle carriers apart. This tendency will be forcible due to the weight of the supported load resting on the apex saddle.

This depressing of the link frame in the direction of the load will cause expansion or spreading of the toggle carriers, which, in turn, will cause a drawing together of the cage members joined by the telescoping pipes. Accordingly, the springs disposed on the telescoping pipes between the structural frame or cage members will be compressed.

It will be seen from the above brief account that the basic functions of this latter embodiment are generally the same as the ones in the first mentioned embodiment. There are, however, considerable differences between the structures. I shall presently render a detailed description of both embodiments, and shall bring out the structural and also functional differences.

Such a toggle support mechanism may be provided for supporting loads of several thousand pounds. The installation will be attended by difficulties due to the fact that the support will have to be adjusted to the exact height of the body which is to be supported. The support may be shipped either completely assembled, or it may be assembled in the place of installation.

In either case, hydraulic means will have to be employed, at the place of installation, for compressing the support to adjust it to the height of the steam pipe or other body from the floor. In the absence of any provisions to hold the support in position, with the exact height adjusted, there will occur difficulties in its final placement.

In order to overcome these difficulties, I have provided locking means for maintaining the support in any adjusted position, with the spring means compressed. The support can therefore be completely assembled, and adjusted to the exact height, in the factory, where all facilities for such work are provided. The adjusted support may then be shipped to the place of installation, and mounted in place under the steam pipe, or other body, without any trouble whatsoever. After the support is thus put in place, the locking means will be released and the support will then be free to function for balancing the load with equal reaction during the displacements of the load.

As will be recalled from previous remarks, a steam pipe may also be subject to a lateral movement, due to buckling. In case of a support which does not take this buckling motion into account, and offers resistance to the lateral displacement of the supported body, damage may be caused due to the wear between the support and the body, since the wear is apt to cause detrimental stresses.

The base saddle of my support is, for this purpose, provided with means which permit a motion of the support lateral thereto, taking care of the above intimated situation. This provision may take different forms as will be explained presently.

Now, in order to teach others to apply the invention to practical use, I will describe the invention in detail with reference to the accompanying drawings, in which:

Figure 1 represents a cross sectional side view of one embodiment of the invention, taken on lines 1—1 in Figure 2;

Figure 2 illustrates a cross section of the support taken on lines 2—2 in Figure 1;

Figure 3 represents a cross section of the base saddle taken on lines 3—3 in Figure 1;

Figure 4 is a side view of another embodiment of the invention, with certain parts omitted or broken away; this view is similar to the view shown in Figure 1;

Figure 5 represents a perspective view of certain parts of the structure illustrated in Figure 4;

Figure 6 is a detail, showing one way of forming the base saddle so as to permit lateral motion of the support; and Figure 7 illustrates another manner of shaping the base saddle in order to permit the lateral motion of the support.

Referring now particularly to Figure 1, the novel support comprises a base saddle designated by the numeral 1. Pivotally mounted in this base saddle, which may be resting on the floor or on a suitable mounting socket, are the link members 2 and 3. The mounting is accomplished by means of a pin 4. The link member 2 is mounted pivotally at its opposite end together with a link member 5 at a toggle saddle 6. The mounting of the link members 2 and 5 to the saddle 6 is again made by means of a pin such as indicated at 7. The link member 3, at its other end, is likewise pivotally mounted, together with the link member 8, at a toggle saddle 9, the mounting being made by means of a pin 10. The toggle saddles 6 and 9 are located opposite each other, in one plane, as shown. The link members 5 and 8 are also pivotally mounted, by means of the pin 11 at the apex or supporting saddle 12. The saddle 12 receives the load or weight such as indicated at 13. In the present case, the load is assumed to be a steam pipe. Suitable material or a suitable member may be interposed between the load and the apex saddle 12 to act as a cushion, if desired.

Each of the link members 2, 3, 5, 8, comprises a pipe which forms the center portion of the respective link member. For example, in connection with the link member 2, the pipe which forms the center portion of this link member is indicated by numeral 14. Attached to the ends of the pipe 14 are bearing members such as indicated by the reference numerals 15 and 16. The bearing member 16, which is shown partly in cross section, has two forked projections, as indicated at 18. The bearing member 15, however, which is attached to the other end of the link pipe 2 is provided with only one central projection, such as indicated by the numeral 17. Each of the link members 2, 3, 5 and 8, is equipped at one end with a bearing or pivot member such as 16 having forked projections, and at the other end with a bearing or member such as 15 having a single central projection. These projections are provided with holes for receiving the pivot pins such as 4, 7, 10 and 11. The single projection of the bearing member on each of the link members is disposed between the forked projections of the bearing member of the adjacent frame member. Thus, the single projection on the bearing member 15 of the link 2 is disposed between the forked projections on the bearing member of the adjacent link 5; the single projection on the pivot member of the link 5 is disposed between the forked projections on the pivot member of the link 8; the single projection on the bearing member of the link 8 is disposed between the forked projections on the pivot member of the link 3; and the single projection on the link 3 is disposed between the forked projections 18 on the pivot member 16 of the link 2. In other words, I have joined the links pivotally to form a rhombus shaped frame.

Referring to Figure 2, it will be seen that each of the toggle saddles such as 6 and 9 is provided with projections such as 19 and 20 having a bearing for receiving the respective pins such as 7. Disposed between these projections 19 and 20 are the projections of the bearing members of the respective links. Thus, the forked projections of the bearing member which is attached to the link pipe 5 are disposed between the projections 19 and 20 of the toggle saddle 6, as shown in Figure 2. Between these forked projections is located the single projection 17 of the bearing member 15 attached to the link 14. The pin 7 extends through the holes in the projections 19 and 20 of the toggle saddle 6 as well as through the holes in the projections on the links 2 and 5. The pin may be finally secured by means of a cross pin extending transversely through the projection 20 as indicated in Figure 2 by the numeral 22. The pivotal attachment of the links 3 and 8 in the toggle saddle 9 disposed opposite the toggle saddle 6 is alike and will be understood without further detailed discussion.

The pivotal attachment of the other ends of the respective links 2, 3, 5 and 8 in the base saddle 1 and in the apex saddle 12, respectively, is similar as may be particularly seen from Figure 3 which shows a section taken on lines 3—3 in Figure 1. It will be seen from Figure 3 that the apex saddle 12 is also provided with projections such as 23 and 24 for receiving the projections on the respective bearing members of the links 5 and 8. The attachment is similar to the one already discussed, by means of a pin such as 11, shown in Figure 3, which may be finally secured by means of a cross pin such as 25. The attachment of the links 2 and 3 to the base saddle 1 which rests on the floor or on a suitable socket is similar.

It will also be seen that each of the toggle saddles is provided with holes such as indicated in connection with the saddle 9 in Figure 2 by the reference numerals 26, 27, 28 and 29, and in connection with the toggle saddle 6 by the reference numerals 30, 31, 32 and 33. Secured in the holes 26 and 29 of the toggle saddle 9 are guide shafts or rods such as 34 and 35, the attachment being made by means of nuts such as 36 and 37. Each of these rods 34 and 35 is provided with a head such as 38 and 39. The shafts or rods 34 and 35 extend through a plate 40, the heads 38 and 39 and the shafts 34 and 35 definitely disposing the plate 40 relative to the toggle saddle 9. The shafts 34 and 35 also extend through suitable holes in the plate 41 as shown. The latter plate (41) is held in place in the arrangement by means of shafts 42 and 43 having heads such as 44 and 45 which hold the plate 41, the shafts 42 and 43 extending through suitable holes in the plate 41 and also extending through holes in the toggle saddle 6, and being fastened to the toggle saddle 6 by means of the nuts such as 46 and 47. Tubular pipe guides 48 and 49 are fastened suitably on the plate 41 and extend through holes in the plate 40, the engagement with the latter plate and the guide pipes 48 and 49 being slidable. Disposed on these guide pipes 48 and 49 between the plates 40 and 41 are compression springs such as 50 and 51.

It will be understood from the above description that the springs 50 and 51 will be compressed when the toggle saddles 6 and 9 move apart in response to the expansion of the support in the plane of the toggle saddles 6 and 9. This action will be more apparent from an examination of Figure 1.

Assuming that the load 13 exerts a certain pressure on the apex saddle 12, the link frame will be depressed relative to the saddles 12 and 1 and will expand relative to the toggle saddles 6 and 9. This expansion, or moving apart of the toggle saddles 6 and 9 will move the plates 40 and 41 toward each other and these plates in turn will compress the springs 50 and 51. The compression of the springs 50 and 51 will therefore be opposed to the expansion or the moving apart of the toggle saddles 6 and 9, thereby also opposing the compression of the saddles 1 and 12 relative to each other. The force of the springs 50 and 50 and therefore the force which is manifest at the apex saddle 12 represents the force which is necessary for supporting the load 13.

Since the load is fixed by the weight of the body which is to be supported, it will be understood that the supporting force must not precipitously increase or decrease at any time during the movement or displacement of the supported body. In other words, equal or substantially equal reaction of supporting force must be provided.

In an ordinary arrangement of a yieldable support, particularly one provided for supporting a heavy body, this precipitous increase or decrease would occur. A heavy spring or springs necessary for providing the required supporting force has no great latitude of expansion. The force would decrease as the spring expands, and it would increase as the spring is compressed. Such an ordinary support would cease entirely when the limit of expansion of the spring means is reached. And since the latitude of expansion is necessarily small in case of heavy springs, this limit is reached soon. This is the reason why a direct spring support can not provide equal reaction and cannot solve the problem as already discussed previously.

With the toggle mechanism which I have provided in my invention, this equal reaction is achieved and the latitude of motion of the support is increased. This will be particularly clear from the following table which shows the force of the above described spring support at varying motion, i. e., rise of the supported body. The angle A in Figure 1 is assumed to be 45° and each spring is assumed to be compressed at 5000 pounds. The reaction on the supported body, depending, of course, on the leverage which is provided in the support, will be as follows:

| Rise | Up force |
|---|---|
| Inches | Pounds |
| 0 | 10,000 |
| 0.6 | 10,000 |
| 1.2 | 10,000 |
| 1.8 | 10,200 |
| 2.3 | 10,200 |
| 2.9 | 10,000 |
| 3.4 | 9,950 |
| 3.9 | 9,950 |
| 4.4 | 9,850 |
| 4.9 | 9,700 |
| 5.5 | 9,600 |
| 6 | 9,300 |

It will be seen from the above table that the supporting force does not diminish at all up to a displacement of the load corresponding to a rise of 2.9 inches. At 3.9 inches the force diminished by only 0.5% of the initial force, and then gradually more until at 6 inches rise only 7% of the supporting force are lost. The support furnishes equal reaction with undiminished supporting force up to a rise of 2.9 inches, while the loss of supporting force during a further rise of the supported body is relatively small.

It is therefore true that my invention furnishes a support having substantially equal reaction for the practical limits of displacement of a supported body which may be encountered in practice.

If the angle A in Figure 1 is assumed to be 41° with each spring compressed at 5000 pounds the reaction on the supported pipe, for various displacements (rise), depending on given conditions of leverage, will be as follows:

| Rise | Up force |
|---|---|
| Inches | Pounds |
| 0 | 8,100 |
| 0.6 | 8,080 |
| 1.3 | 8,100 |
| 2.0 | 8,100 |
| 2.4 | 8,100 |
| 3.0 | 8,100 |
| 3.6 | 8,070 |
| 4.2 | 8,060 |
| 4.7 | 7,980 |
| 5.3 | 7,800 |
| 5.8 | 7,800 |
| 6.3 | 7,725 |
| 6.8 | 7,510 |

The above table shows again, as in the previous case, that my invention is capable of furnishing a support which gives substantially unaltered reaction up to three inches displacement or rise of the supported body, without any loss of supporting force, while the loss of supporting force during further movement of the supported body is exceedingly small. In fact, the loss of supporting force, within the practical limits of displacement which may occur in practice even under severe operating conditions, is so small that it cannot effect the statement that my support furnishes equal reaction within the practical limits of operation.

The friction on the joints has not been included in the above tables. However, the results will not be greatly altered under normal conditions. It is, of course, understood that the values given above depend upon the dimensions and upon the leverages of the link support. The above examples recite the values given by certain supports, and I have included the tables in order to show the performance of the previously described embodiment when the same is subjected to practical tests.

The other embodiment of the invention, sketched in general terms previously, may be best described by first referring to the view of the central part of the support, which forms a cradle or cage and includes the operating spring means as shown in Figure 5.

It will be seen from this figure that the central part of the support comprises two toggle carriers or saddles designated by the reference numerals 55 and 56. Pivotally mounted in these toggle carriers may be link frame members such as indicated in Figure 4 by the reference numerals 57, 58, 59 and 60. I have not shown these link frame members in Figure 5 in order to keep this drawing as simple as possible so that the relation of the toggle carriers to the springs, and the interdependence of these carriers as well as their operation may be easily described. Each of these toggle carriers 55 and 56 is provided with a notch or slot as shown, for receiving the pivot ends of the corresponding link frame members. Holes 61—62 and 63—64, respectively, are provided in the toggle carriers 55 and 56 for mounting the above mentioned link members in pivotal engagement with the toggle carriers. Each carrier is also provided with four holes for receiving the rods 65—66 and 67—68, respectively. The rods 65 and 66 hold the toggle carrier 55 in engagement with the structural frame member 69, while the rods 67 and 68 hold the toggle carrier 56 in engagement with the frame member 70. The structural frame members 69 and 70, with other parts yet to be described, form the cage or cradle for the toggle carriers. It will be seen that the rods 67 and 68 are provided with the nuts 71 and 72 which are attached to the threaded ends of the rods 67 and 68 projecting through the toggle carrier 55 and through the frame member 70. These rods extend also through the toggle carrier 56 and are provided with nuts at their other threaded ends, in a similar manner as the nuts 73 and 74 maintain the ends of the rods 65 and 66 in engagement with the toggle carrier 55. The other ends of the rods 65 and 66 project through the toggle carrier 56 as shown and also through the frame member 69, and are held in engagement with the frame member 69 by nuts attached to their threaded ends in a similar manner as the nuts 71 and 72 are attached to the rods 67 and 68, holding these rods in engagement with the frame or cage member 70.

It will be apparent from the above account of the toggle carriers 55 and 56 and their mounting relative to the frame or cage members 69 and 70, that the toggle carrier 55 is limited in its sliding motion along the guide rods by the nuts 73 and 74 and by the attachment of the rods 65 and 66 to the frame member 69, by means of nuts 65' and 66', as is particularly shown in Figure 4. Likewise, the toggle carrier 56 is limited in its sliding motion along the rod by the nuts 71—72 and 67'—68' which are attached to the ends of the rods 67 and 68, as shown in Figures 4 and 5, holding these rods in engagement with the frame member 70 and with the toggle carrier 56. It is, of course, understood that bolts could be provided, each having a suitable head, in place of the rods with the threaded ends which take the nuts. These bolts may be of the form for example as the bolts which have been described in connection with the structure shown in Figures 1, 2, 3, inclusive.

Attached to the frame member 70 are two pipes designated by the numerals 75 and 76, respectively. The frame member 69 is also provided with two pipes such as indicated by the numeral 77. The latter pipes telescope into the larger pipes 75 and 76 as shown. These pipes serve as guides for the compression springs 78 and 79 when the support is assembled as shown, with the pipes telescoping into one another. The central portion of the springs 78—79 has not been shown in Figure 5 in order to illustrate the relation of the telescoping pipes more clearly.

With the above structure described with reference to Figures 4 and 5 in mind, it will be understood that a spreading of the toggle carriers 55 and 56 will cause a pulling together of the frame or cage members 69 and 70 against the force of the compression springs 78 and 79. The toggle carrier 55 when moved toward the left in the drawings Figure 5, will exert a pull upon the case member 69, due to the fact that the rods 65 and 66 are attached so as to join the toggle carrier 55 and the member 69 as previously described. A force exerted upon the toggle carrier 56 and moving the same toward the right in Figure 5, will, likewise, exert a pulling force upon the rods 67 and 68, thereby pulling the frame member 70 toward the right.

The moving or spreading apart of the toggle carriers 55 and 56 will occur when a load is placed upon the support, that is to say, upon the apex saddle 80, shown in Figure 4. The base saddle 81 may be placed on the floor or on a suitable mounting socket. Now, when the load depresses the apex saddle 80 relative to the base saddle 81, it will be understood that the link frame comprising the members 57—58 and 59—60 will be depressed, and, since the ends of these link members are pivotally mounted in the toggle carriers 55 and 56, as previously described, the result will be that the toggle carriers 55 and 56 are spread apart. Accordingly, the frame members 69 and 70 are drawn together against the force of the compression springs 78 and 79. The compression springs therefore oppose the force of the load placed upon the apex saddle 80.

The link members 57—58 and 59—60, respectively, are pivotally mounted in the toggle carriers 55 and 56 by means of the pins 82 and 83 as shown in Figure 4. These pins extend through the openings in the toggle carriers designated by numerals 61—62 and 63—64, respectively, as shown in Figure 5, and previously discussed.

It will not be necessary to describe the structure of the link members 57—58 and 59—60 in detail, in view of the fact that these members may be constructed similarly as was already discussed in connection with the previously explained embodiment. It is understood, of course, that the structure of the links may be changed, if desired. A separate member may be interposed between the load and the apex saddle 80 if desired or necessary. This has already been discussed previously.

It will be recalled that I have also provided means for permitting a lateral movement of the support. Referring now to Figures 6 and 7, these figures show a base support in each instance and illustrate two ways in which this object can be realized.

In Figure 6, I have shown a side view of the base saddle 81. The links 59 and 60 are pivotally mounted in this saddle by means of a pin 86. The lower portion of the base saddle 81 is curved as shown, and rests on the floor or on a suitable socket indicated by cross-hatching. Due to the fact that the base saddle is provided with the curved portion on which it rests on the floor or on the socket, the support can rock or follow lateral movements of the supported body which may occur due to buckling thereof.

In Figure 7 is shown another manner of achieving the above described result. In this case I have shown a base saddle 87 in which are mounted the link members, such as 85, by means of a pin 88. The bottom of the saddle 87 is provided with a notch for engaging a pin 89 which may rest in a similar notch provided in a socket 90. The socket 90 may rest on the floor as indicated by cross-hatching. Should buckling of the supported body occur, the support will follow and rock laterally.

It will also be recalled that I have provided means for locking the completely assembled support in any position, with the springs compressed. This locking provision may consist of a bolt such as 91 shown in Figures 4 and 5, and this bolt, when tightened in its place, may engage the corresponding rod in the toggle carrier 56 in such a manner as to lock this toggle saddle relative to the rod 66, and also relative to the other rods. Several such locking bolts may be provided in conjunction with the toggle carriers 55 and 56, at places where the guide rods extend through these carriers. It will be found, however, that one or at the most two such bolts are sufficient. The support may be hydraulically adjusted to a certain height as demanded by the installation. When the desired adjustment is achieved, the locking bolt such as 91 will be tightened against the corresponding rod, and will lock the toggle carriers 55 and 56 firmly in place in engagement relative to the various guide rods. The support, thus adjusted and locked, may be shipped to the place of installation and simply put under the load which is to be supported. The locking bolt or bolts will then be released, and the mechanism will be free to support the load with equal reaction and in a balanced way, in any position of the load during displacements thereof.

The above explained embodiment of the invention funishes substantially the same favorable values in operation as I have discussed previously in connection with the first described structure. The rendition of another table showing the values which the structure disclosed in the Figures 4 and 5 renders during operation, would therefore involve a mere repetition of matter already known from previous explanations.

It will be seen from the above discussion that my invention achieves the objects outlined previously. It renders a yieldable support for bodies which are subject to displacements and furnishes this support equally regardless of the displacements of the supported body within practical limits of operation.

In other words, the support which I have invented reacts equally and renders substantially the same supporting force at any point within practical limits of displacement or movement of the supported body. The invention, as incorporated in the above described embodiments, also balances the load in a more advantageous manner than previous attempts at the solution of this problem of supporting shifting loads. Another object is achieved by the locking means for the support as discussed in connection with the last described embodiment. Obviously, this locking means can also be provided in the structure shown in Figures 1 to 3, inclusive, and represents, therefore, a feature common to both structures. The same is the case with the feature of providing a base saddle which permits lateral motion of the support.

Various modifications may be devised by following the teaching of my invention. For example, the link members 5—8, 2—3, and 57—58, 59—60, respectively, may be mounted separately instead of uniting them in pivotal engagement with the base saddles 1—12 or 80—81, respectively, as I have shown. The links may also be mounted pivotally at the ends of plates or the like (one plate for taking the load, and the other for placing the support) if desired. This embodiment may be advantageously adopted in certain cases and may be carried out without adding novelty to what I have disclosed. Another modification which is possible and which may easily be devised may be represented by an arrangement whereby the link members, instead of being pivotally attached to the base and to the apex saddles in the plane which cuts perpendicularly through the center line, may be arranged to radiate from brackets holding the spring or springs, and the radiating links may then be pivotally mounted in planes outside the plane denoted by the springs. This latter arrangement would provide for a wide apex member for taking the load and also for wide base for placing the support. It may also be desirable to employ the support for a straight vertical run of a steam pipe or the like. Two such supports as I have shown in either embodiment may be used in such a case, each placed on one side of the pipe opposite each other and connected by a clamp like member that embraces the pipe. The pipe may also be provided with a flange having suitable projections for resting on the supports at opposite sides. The apex member may be suitably shaped to form a cradle or flange, if desired. The springs may be properly dimensioned and the frame parts correspondingly proportioned and altered in accordance with the effect which it is desired to achieve. Such and other modifications are obviously possible and may be carried out within the scope of my invention.

I therefore desire to have it understood that I have illustrated the invention in connection with specific structures merely for the purpose of showing examples of how the same may be realized in practice, and not in order to show the limitations of the inventive thoughts. I intend to apply and to use the invention in all embodiments deviating from the specific structures shown, subject only to the limitations of the following claims in which I have defined what I believe is new and distinguishing in the art.

I claim:

1. In a follower support for balancing the weight of a supported body subject to displacements, a first and a second toggle saddle, a pair of frame links pivotally mounted in each of said saddles and extending angularly therefrom, means interconnecting said links, a pair of plates disposed in the plane of said toggle saddles, spring means disposed between said plates, guide means for said spring means, said guide means being attached to one of said plates and slidable through said other plate, and means cooperating with said toggle saddles for transmitting the force of said spring means to said frame links.

2. A support of the class described, comprising a rhombus shaped link frame, toggle saddles for pivotally securing the joints of said link frame, a spring disposed in the plane of two of said toggle saddles, a pair of plates, one anchored to each of the toggle saddles, and telescoping guide means for said spring comprising a sleeve anchored to one of said plates and slidable with respect to the other.

3. A support for objects subject to displacements in a plurality of directions, comprising a rhombus shaped link frame, toggle saddles for movably securing the joints of the said frame in assembly, said toggle saddles including a base saddle for mounting said support, an apex saddle for receiving the load, and two side saddles, a pair of members forming a cage for enclosing said side saddles, springs disposed between said members, tubular telescoping guide means for said springs, guide rods for slidably connecting said side saddles with said members, said side saddles actuating said members to compress said springs responsive to the action of said link frame upon placing said load on said apex saddle, said compression of said spring being effective to balance said load with substantially equal reaction during displacements thereof in one direction, and means cooperating with said base saddle for permitting motion of said supports responsive to displacements of said load in said other directions.

4. A support for objects subject to displacements in a plurality of directions, comprising a rhombus shaped link frame, toggle saddles for movably securing the joints of said frame in assembly, said toggle saddles including a base saddle for mounting said support, an apex saddle for receiving the load, and two side saddles, a pair of members forming a cage for enclosing said side saddles, springs disposed between said members, tubular telescoping guide means for said springs, guide rods for slidably connecting said side saddles with said members, said side saddles actuating said members to compress said springs responsive to the action of said link frame upon placing said load on said apex saddle, said compression of said springs being effective to balance said load with substantially equal reaction during displacements thereof substantially in one direction, means on said base saddle for permitting the yielding of said support responsive to displacements of said load in said other directions, and means cooperating with said side saddles and with said guide rods for locking said support in any predetermined position with said springs compressed.

5. A support for objects subject to displacements in a plurality of directions, comprising a rhombus shaped link frame, toggle saddles for movably securing the joints of the said frame in assembly, said toggle saddles including a base saddle for mounting said support, an apex saddle for receiving the load, and two side saddles, a pair of members forming a cage for enclosing said side saddles, spring means disposed between said members, said side saddles actuating said members to compress said spring means responsive to the action of said link frame upon placing said load on said apex saddle, and means cooperating with said base saddle for permitting motion of said supports responsive to displacements of said load in said other directions.

6. A support for objects subject to displacements in a plurality of directions, comprising a rhombus shaped link frame, toggle saddles for movably securing the joints of the said frame in assembly, said toggle saddles including a base saddle for mounting said support, an apex saddle for receiving the load, and two side saddles, a pair of members forming a cage for enclosing said side saddles, springs disposed between said members, guide means for said springs, guide rods for slidably connecting said side saddles with said members, said side saddles actuating said members to compress said springs responsive to the action of said link frame upon placing said load on said apex saddle, means cooperating with said base saddle for permitting motion of said supports responsive to displacements of said load in said other directions, and means cooperating with said side saddles and with said guide rods for locking said support in any predetermined position with said springs compressed.

In witness whereof, I hereunto subscribe my name this 2nd day of March A. D., 1931.

ANDREW R. LE BAILLY.